Patented Oct. 11, 1949

2,484,523

UNITED STATES PATENT OFFICE 2,484,523

PROCESS FOR MAKING POLYAMIDE FILAMENTS

William R. McClellan, Roselle, Del., assignor to E. I. du Pont de Nemours & Company, Wilmington, Del., a corporation of Delaware No Drawing. Application January 4, 1945, Serial No. 571,367

6 Claims. (Cl. 18—54)

This invention relates to synthetic linear polyamide compositions and more particularly to an improved method for shaping synthetic linear fiber-forming polyamide compositions.

It is known that a nylon which is quenched or rapidly cooled from the melt has improved cold-drawing properties. In the cold-drawing operation, however, orientation is normally developed which limits the practical draw ratio and prevents the production of filaments of very fine denier size. Furthermore, the maximum draw ratio obtainable with oriented nylon is insufficient to permit the satisfactory production of articles by impact extrusion, for example, collapsible tubes.

This invention has as an object a method for preparing shaped articles from molten polyamide compositions. A further object is an improved method for preparing shaped articles from polyamide compositions and effecting orientation therein. A still further object is a method for preparing oriented filaments of polyamide compositions of finer denier than is possible with processes heretofore known. Additional objects will become apparent from an examination of the following description and claims.

These and other objects and advantages are accomplished according to the herein-described invention which broadly comprises shaping by extending under application of stress a supercooled composition comprising a synthetic linear polyamide, said composition being characterized by a pseudo melting point for a limited period of time after cooling and being further characterized by orientation development under stress after the disappearance of said pseudo melting point, said shaping being effected at a temperature above said pseudo melting point and below the normal melting point of said composition, the shaping process being carried out while said composition has said pseudo melting point.

In a more restricted embodiment this invention comprises shaping by extending under application of stress a supercooled composition comprising a synthetic linear polyamide, said composition being characterized by a pseudo melting point for a limited period of time after cooling and being further characterized by orientation development under stress after the disappearance of said pseudo melting point, said shaping being effected at a temperature above said pseudo melting point and below the normal melting point of said composition, the shaping process being carried out while said composition has said pseudo melting point and thereafter aging the resultant shaped composition until crystallinity is developed therein and said pseudo melting point disappears and then extending the shaped aged composition under application of stress whereby orientation of said shaped composition is effected.

By "pseudo melting point," as employed herein and in the appended claims, is meant the temperature above which the synthetic linear polyamide composition is in a noncrystalline state and does not develop orientation on the application of stress and can be shaped or extended under a stress of only a fraction of that required for crystalline synthetic linear polyamide compositions. The pseudo melting point is at least 20° C. and in most cases in the order of 100° C. below the normal melting point of the crystalline orientable polyamide composition.

By "normal melting point," as used herein and in the appended claims, is meant the temperature at which the solid crystalline synthetic linear polyamide changes to liquid.

The following example, in which proportions are in parts by weight, is given for illustrative purposes and is not intended to place any restrictions on the hereindescribed invention:

*Example*

Eighty parts of polyhexamethylene sebacamide in chip form was mixed in a W. & P. mixer heated to 100° C. with 20 parts of a nylon-compatible acid-catalyzed phenolformaldehyde resin the preparation of which is described below. As soon as the polyamide chips appeared uniformly coated with the molten resin, the mixture was cooled and the material was discharged. This resin-coated polyamide chip material was melted at 275° C. and extruded in the form of filaments into a water-quenching bath at 25° C. The extruded filament was passed directly around a 12 inch feed roll, through a second water bath at 90° C. and around a 12 inch draw roll having a surface speed 5 times that of the first roll, and finally onto a wind-up roll. With this arrangement a time of somewhat less than 20 seconds elapsed from the time the filament was extruded until it reached the wind-up roll. With the second water bath at 90° C. a temperature intermediate between the pseudo melting point (72° C. as shown subsequently) and the normal melting point (185° C.) of the composition, the tension on the filament between the rolls was only a fraction of the normal tension developed during drawing of synthetic linear polyamide compositions. This stretched filament had the strength, physical properties, and X-ray diffraction pattern of unoriented resin-modified polyamide indicating that no orientation was developed during the stretching operation.

Ten minutes after the stretching operation the filament was again carried through the same stretching process with the water bath at 90° C. This time the filament was oriented by the stretching operation. The tension on the filament between the rolls in this second stretching operation was in the range encountered during the orientation of polyamides, and the stretched filament had the strength, X-ray diffraction pattern, and physical properties of highly oriented resin-modified polyamide. The denier of this final filament was 1/25 of the filament as originally spun.

A filament of the same composition as above was spun and stretched in the same manner as described previously excepting that the water bath between the stretching rolls was slowly cooled from 90° C. during the operation. At a temperature of 72° C. the tension on the filament between the rolls increased very sharply. The tension on the filament further increased only slightly on cooling the water bath to 55° C. at which temperature frequent breaks during the stretching operation occurred. The filaments stretched in water at 55-72° C., a temperature range below the pseudo melting point, were found to be highly oriented and could not be carried through a subsequent stretching operation. On heating the water bath slowly from 55° C. to a higher temperature, a marked decrease in tension on the filament between the stretching rolls occurred at 80° C. This procedure was repeated several times with the same result each time; that is, on decreasing the bath temperature the change in stretching tension occurred at 72° C. while on increasing the bath temperature the change occurred at 80° C.

A filament of the same composition was spun and aged before stretching until crystallinity had developed and the pseudo melting point had disappeared. This filament developed normal orientation on stretching in the water bath heated to 100° C.

The phenol-formaldehyde resin used in preparing the modified polyhexamethylene sebacamide used in this example was prepared by condensing 900 parts of phenol with 580 parts of 37% aqueous formaldehyde solution in the presence of 9 parts of ammonium chloride and 10 parts of oxalic acid as the catalyst.

While this invention has been illustrated with particular reference to polyhexamethylene sebacamide modified with a nylon-compatible phenol-formaldehyde resin, it is contemplated that any composition comprising a synthetic linear polyamide is operative herein provided said composition has a pseudo melting point for a limited period of time after it is cooled and further provided said composition develops orientation under stress after disappearance of said melting point. Thus, substantially all of the synthetic linear polyamides of the general type described in U. S. Patents 2,071,250, 2,071,253 and 2,130,948 are operative in the instant invention after suitable modification with nylon-compatible resins and/or plasticizers. Furthermore, it is probable that the unmodified polyamides on cooling exist for a time in an unstable state in which they have a pseudo melting point and may, therefore, in certain instances be employed in the instant invention. In the case of said unmodified polyamides, however, the temperature range between the pseudo melting point and the normal melting point is much narrower than it is in the case of the modified polyamides, and the unmodified polyamide exists in this unstable state for such a short period of time that in ordinary work it is never encountered. In general, the compositions commercially operative in the present invention are synthetic linear polyamides modified with an agent selected from the group consisting of nylon-compatible resins and plasticizers, i. e. are compositions comprising a major proportion (e. g. 80% by weight) of a synthetic linear polyamide and a minor proportion (e. g. 20% by weight) of a material selected from the group consisting of nylon-compatible resins and plasticizers. Included among examples of said compositions are: synthetic linear homopolyamides, e. g. polyhexamethylene sebacamide, modified with a nylon-compatible phenol-formaldehyde resin; and synthetic linear interpolyamides modified with a nylon-compatible resin or plasticizer, e. g. an interpolymer of hexamethylene adipamide with hexamethylene sebacamide, modified with a nylon-compatible phenol-formaldehyde resin, and a hexamethylene adipamide/hexamethylene sebacamide/caprolactam interpolymer modified with the plasticizer glycerine, and a hexamethylene adipamide/hexamethylene sebacamide/caprolactam interpolymer modified with the plasticizer N-ethyl-p-toluene-sulfonamide.

By the process of this invention, as illustrated by the example, it is possible to spin yarns of lower deniers than otherwise obtainable. Although the invention is illustrated with particular reference to filament spinning, it is also applicable to impact extrusion, for example, in the preparation of collapsible tubes, to the preparation of sheetings on calender or rubber rolls, to the coating of fabrics on calender rolls, to the preparation of rodding and tubes and wire coverings by means of a screw stuffer. By shaping the polyamide compositions of this invention, that is, those having a pseudo melting point, at a temperature below the normal melting point and above the pseudo melting point during the time while the pseudo melting point is present, these compositions may be handled according to operations that are standard practice in the shaping of highly plastic materials. This has not heretofore been possible by methods previously described for shaping synthetic linear polyamides.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. In a process for obtaining a shaped and oriented synthetic linear polyamide article by subjecting a synthetic linear polycarbonamide composition to sufficient stress for producing substantial extension and deformation without development of molecular orientation, and subsequently producing molecular orientation by subjecting the previously extended and deformed but unoriented polycarbonamide composition to additional extending and deforming stress, the steps which comprise converting a molten fiber-forming composition comprising a synthetic linear polycarbonamide, which has a pseudo-melting point of at least 20° C. below the normal melting point of the polycarbonamide in its crystalline form, to super-cooled non-crystalline state by rapidly cooling the molten composition below its pseudo-melting point, then before the composition has passed to the crystalline form heating it above its pseudo-melting point and below its normal melting point and subjecting this super-cooled non-crystalline and essentially non-orientable polycarbonamide composition to stress which extends and deforms the polycarbonamide composition to a degree which will cause molecular orientation of a like synthetic linear polycarbonamide composition when it is in the crystalline state, and then, after an appreciable time interval has elapsed within which crystallinity has developed in the polycarbonamide, shaping the composition to desired form under application of extending and deforming stress which produces molecular orientation and increases the strength of the polycarbonamide article.

2. The process set forth in claim 1 in which said linear polycarbonamide composition comprises a major proportion of said polycarbonamide and a minor proportion of a resin compatible therewith.

3. The process set forth in claim 1 in which said linear polycarbonamide composition comprises a major proportion of said polycarbonamide and a minor proportion of a plasticizer compatible therewith.

4. A process for obtaining synthetic linear polycarbonamide in the form of a thin object which is essentially molecularly unoriented but which is capable of such orientation, said process comprising extruding a molten composition comprising a synthetic linear polycarbonamide, which has a pseudo-melting point of at least 20° C. below the normal melting point of the polycarbonamide in its crystalline state, into a liquid quenching bath to cool said composition below its pseudo-melting point and convert it to supercooled non-crystalline state, removing the extruded composition from the bath, and heating the extruded composition to a temperature intermediate its pseudo-melting point and its normal melting point, and while said composition is at said temperature shaping it in the form of a thin object under extending and deforming stress which extends and deforms the polyamide composition to a degree which will cause molecular orientation in a like synthetic linear polyamide composition when it is in the crystalline state, said process being completed before said composition has passed to crystalline state, thereby yielding the shaped object in essentially unoriented state, said synthetic linear polycarbonamide composition comprising a major proportion of said polycarbonamide and a minor proportion of a resin compatible therewith.

5. A process for obtaining synthetic linear polycarbonamide in the form of a thin object which is essentially molecularly unoriented but which is capable of such orientation, said process comprising extruding a molten composition comprising a synthetic linear polycarbonamide, which has a pseudo-melting point of at least 20° C. below the normal melting point of the polycarbonamide in its crystalline state, into a liquid quenching bath to cool said composition below its pseudo-melting point and convert it to supercooled non-crystalline state, removing the extruded composition from the bath, and heating the extruded composition to a temperature intermediate its pseudo-melting point and its normal melting point, and while said composition is at said temperature shaping it in the form of a thin object under extending and deforming stress which extends and deforms the polyamide composition to a degree which will cause molecular orientation in a like synthetic linear polyamide composition when it is in the crystalline state, said process being completed before said composition has passed to crystalline state thereby yielding the shaped object in essentially unoriented state, said synthetic linear polycarbonamide composition comprising a major proportion of said polycarbonamide and a minor proportion of a plasticizer compatible therewith.

6. A process for obtaining low denier filaments which comprises extruding into a quenching bath having a temperature below 72° C. a filament from a molten mixture of synthetic linear polyamide and an acid-catalyzed phenol-formaldehyde resin compatible with said polyamide and present in said mixture in an amount of about 20% by weight of the polyamide and resin, heating the extruded filament before it has passed to crystalline form within the temperature range of above 72° C. and below 185° C., immediately stretching said filament within said temperature range and then, after an appreciable time has elapsed within which crystallinity has developed in said filament, again stretching the filament until it exhibits substantial increase in strength and shows molecular orientation by X-ray diffraction patterns.

WILLIAM R. McCLELLAN.

REFERENCES CITED

The following references are of record in the file of this patent:

UNITED STATES PATENTS

| Number | Name | Date |
| --- | --- | --- |
| 2,157,117 | Miles, Jr. | May 9, 1939 |
| 2,157,118 | Heckert | May 9, 1939 |
| 2,285,552 | Alfthan | June 9, 1942 |
| 2,307,846 | Miles | Jan. 12, 1943 |
| 2,323,383 | Dreyfus | July 6, 1943 |